Figure 1:
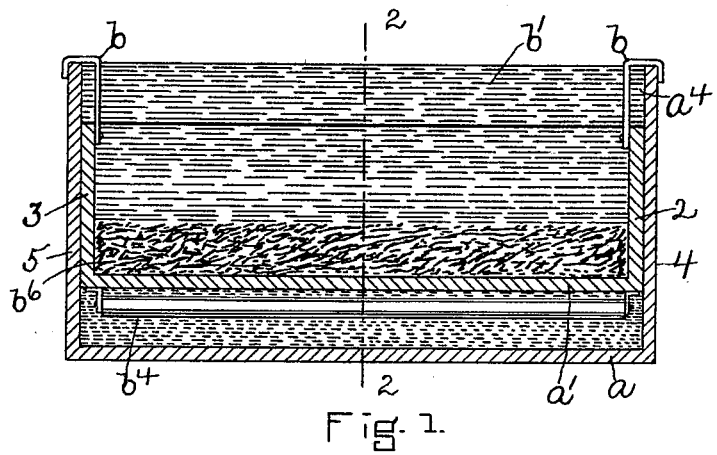

No. 636,750. Patented Nov. 14, 1899.
E. I. BRADDOCK.
APPARATUS FOR GALVANIZING.
(Application filed Oct. 13, 1898.)

(No Model.)

WITNESSES.
Matthew M. Blunt.
J. Murphy.

INVENTOR.
Edward I. Braddock
by Jas. H. Churchill
ATT'Y.

THE NORRIS PETERS CO., PHOTO-LITHO., WASHINGTON, D. C.

UNITED STATES PATENT OFFICE.

EDWARD I. BRADDOCK, OF MEDFORD, MASSACHUSETTS, ASSIGNOR TO THE NEW PROCESS COATING COMPANY, OF PORTLAND, MAINE.

APPARATUS FOR GALVANIZING.

SPECIFICATION forming part of Letters Patent No. 636,750, dated November 14, 1899.

Application filed October 13, 1898. Serial No. 693,407. (No model.)

*To all whom it may concern:*

Be it known that I, EDWARD I. BRADDOCK, a citizen of the United States, residing in Medford, in the county of Middlesex and State of Massachusetts, have invented an Improvement in Apparatus for Galvanizing, of which the following description, in connection with the accompanying drawings, is a specification, like letters and figures on the drawings representing like parts.

This invention relates to an apparatus for galvanizing metals, and is especially applicable for galvanizing iron or steel in the form of sheets, plates, wires, netting, or strips.

In galvanizing iron a dross is formed as soon as the iron is brought in contact with the galvanizing molten zinc, and with apparatus as now commonly constructed the dross referred to settles to the bottom of the vessel or tank containing the zinc-bath, and the said bath soon becomes contaminated by the dross which adheres to the iron plate, &c., as the latter is passed into and out of the galvanizing-bath. The formation of the dross referred to is rapid and soon accumulates in the tank or vessel in such quantities or amounts as to require suspension of the process for the purpose of removing the dross, thereby occasioning delay, expense, and waste of galvanizing metal.

My present invention has for its object to galvanize iron or steel in the form of sheets, strips, &c., in a manner as will be described, whereby the formation of the dross is reduced to a minimum and that which is formed is automatically removed from contact with the iron plate, &c., and from the galvanizing-bath into and out of which the iron plate is passed, and whereby a maximum number of plates, &c., may be galvanized with a given quantity or amount of galvanizing metal, as will be described.

In accordance with this invention I employ an apparatus comprising an outer vessel and a smaller inner vessel located in said outer vessel below the upper edge thereof and above the bottom of the outer vessel to form a continuous chamber extended beneath the inner vessel from one side to the other of the outer vessel. The inner vessel is filled with galvanizing metal, and the chamber beneath the said vessel is filled with metal of greater specific gravity, upon which rests galvanizing molten metal in the outer vessel above the inner vessel, so that in galvanizing the iron plate, &c., it is passed through a substantially thin layer of galvanizing metal at one side of the apparatus and into the bath of metal of greater specific gravity, out of which it passes into and through the substantially thin layer of galvanizing metal at the other side of the apparatus, the dross formed by contact of the iron plate with the galvanizing metal resting on the surface of the bath of metal of greater specific gravity and being automatically removed therefrom substantially as fast as formed by overflowing into the chamber containing the body of galvanizing metal. These and other features of this invention will be pointed out in the claims at the end of this specification.

Figure 2:
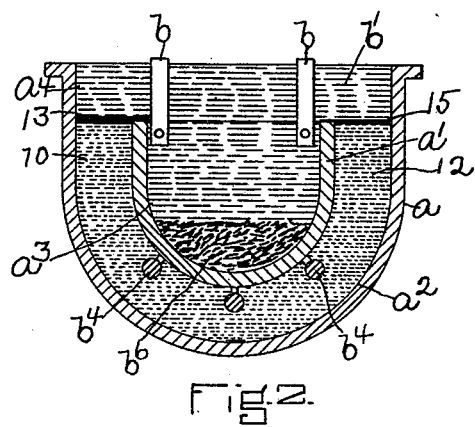

Figure 1 is a longitudinal section of one form of galvanizing apparatus embodying this invention, and Fig. 2 a transverse section of the apparatus shown in Fig. 1 on the line 2 2.

The apparatus shown in Fig. 1 as embodying this invention consists of an outer vessel or tank $a$ and a smaller vessel or tank $a'$, located within the vessel or tank $a$ and separated therefrom to form chambers $a^2$ $a^3$, which of themselves are of less area than the tank or vessel $a$ and both of which communicate directly with the space $a^4$ within the tank $a$ above the upper edge of the vessel $a'$, which space is of substantially the area of the tank $a$. The vessel $a'$ is shown in Fig. 1 as separate from the vessel $a$; but it practically forms a partition-wall within the vessel $a$ below its upper edge, so as to divide the vessel $a$ into practically two chambers $a^2$ $a^3$, which communicate with the common chamber or space $a^4$. The vessel $a'$ may be suspended within the vessel $a$ by means of straps or arms $b$, and its end walls 2 3 may be substantially in contact with the end walls 4 5 of the vessel $a$.

The chamber or space $a^2$ may and preferably will be filled with a metal of greater specific gravity than the galvanizing metal and preferably lead. The galvanizing metal (indicated by the broken lines $b'$) may and preferably will normally fill the chamber $a^3$ and substantially fills the space or chamber $a^4$, so as to form in this space a substantially thin or shallow layer of galvanizing metal. As shown in Fig. 2, the chamber $a^2$ continues under the bottom wall of the chamber $a^3$ and when filled with molten lead substantially up to the level with the upper edge of the said wall forms two connected substantially upright columns of lead, which for convenience may be marked 10 12.

With the apparatus shown in Fig. 1 the process of galvanizing may be carried on as follows: The iron or steel plates, strips, &c., are entered into the chamber $a^2$ at one side of the apparatus and are passed under the bottom wall of the chamber $a^3$ and up out of the vessel $a$ at the opposite side of the apparatus. To facilitate the passage of the plates, strips, &c., through the chamber or space $a^2$, one or more rollers $b^4$ may be suspended from the bottom of the inner vessel $a'$. By reference to Fig. 2 it will be seen that a substantially shallow body of the zinc or galvanizing metal lies above the column of lead 10, and consequently the amount of dross formed by combination of the zinc with the iron surfaces of the plates, &c., is in this manner reduced, as the formation of the dross increases in proportion to the depth of the zinc through which the iron plate is passed and also to the time the said plate remains in contact with the zinc. The dross formed on the plate by the action of the zinc is removed therefrom by the entrance of said plate into the bath of metal of greater specific gravity—namely, the column 10 of the lead-bath—and the dross being lighter than the lead floats to the top of the lead-bath and forms a layer, which is indicated in Fig. 2 by the heavy black lines 13. As the layer 13 of dross accumulates it overflows the edge of the partition-wall of the chamber $a^3$ and being heavier than the zinc gravitates to the bottom of the chamber $a'$, where it accumulates, as represented by $b^6$. The lead-bath is made of sufficient quantity of lead to keep its upper surface substantially on a level with the upper edge of the wall of the chamber $a^3$ to thereby avoid the formation of a layer of dross between the lead and zinc of any material or excessive depth, so as to reduce to a minimum the quantity of dross through which the iron plate, &c., is passed. The plate, &c., on its passage through the lead-bath is cleansed of the dross and of the zinc, so that it presents a clean surface to the action of the layer of zinc above the column 12 of lead in the chamber $a^2$ at the opposite side of the apparatus, and as the iron plate emerges from the column 12 of molten lead it passes up through the zinc layer above it and is nicely galvanized.

Owing to the superior condition of the iron plate as it emerges from the lead-bath a smaller amount of dross is formed on its passage out through the layer of zinc; but whatever dross is thus formed accumulates over the column 12 of lead and forms a thin layer 15, and as this layer 15 is built upon the dross overflows into the chamber $a^3$. As the dross accumulates in the chamber $a^3$ it gradually displaces the zinc in said chamber and acts to automatically renew the layer of zinc in the chamber $a^4$. The dross may be allowed to accumulate in the chamber $a^3$ until the latter is substantially filled, if desired, and it may then or previous thereto be removed by suitable means—as, for instance, by a ladle or dipper—without in the least interfering with the process of galvanizing.

The zinc-bath may be renewed without interruption of the process by placing sheets or pieces of zinc in the chamber $a^3$, where it is melted, and in this manner the layer of zinc in the chamber or space $a^4$ may be renewed and kept substantially constant for an indefinite time, thereby enabling the galvanizing process to be carried on continuously with but little attention or care and at a minimum expense. So, also, it will be noticed that a maximum extent or amount of surface may be galvanized with a given quantity of zinc, owing to the minimum formation of dross, which is automatically removed substantially as fast as formed from the surface of the lead-bath.

It will be understood that the vessel $a$ in practice is heated in any suitable manner to keep the lead in a molten state, and the heat of the lead-bath melts the zinc.

I prefer to place the lead-bath in the chamber $a^2$ and the zinc in the chamber $a^3$, as shown; but, if desired, the lead-bath may be placed in the chamber $a^3$ and the zinc in the chamber $a^2$, in which case the plates, &c., will be passed through the layer of zinc above the lead-bath in the chamber $a^3$ and the dross will overflow into the chamber $a^2$ and automatically feed the zinc in the chamber $a^2$ up to the layer above the chamber $a^3$.

I claim—

1. A galvanizing apparatus comprising an outer vessel, and a smaller inner vessel located in said outer vessel below the upper edge thereof and above the bottom of the outer vessel to form a continuous chamber extended beneath the inner vessel from one side to the other of the outer vessel, substantially as described.

2. A galvanizing apparatus comprising an outer vessel, and a smaller inner vessel suspended in said outer vessel below the upper edge thereof and separated from the outer vessel to leave a chamber $a^2$, substantially as described.

In testimony whereof I have signed my name to this specification in the presence of two subscribing witnesses.

EDWARD I. BRADDOCK.

Witnesses:
JAS. H. CHURCHILL,
J. MURPHY.